US006338568B1

(12) United States Patent
Futami

(10) Patent No.: US 6,338,568 B1
(45) Date of Patent: Jan. 15, 2002

(54) PROJECTION LAMP

(75) Inventor: Takashi Futami, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/427,676

(22) Filed: Oct. 27, 1999

(30) Foreign Application Priority Data

Oct. 27, 1998 (JP) .......................................... 10-305781

(51) Int. Cl.⁷ ................................................ B60Q 1/04
(52) U.S. Cl. ........................ 362/538; 362/308; 362/328
(58) Field of Search ................................ 362/538, 539, 362/328, 308, 343

(56) References Cited

FOREIGN PATENT DOCUMENTS

| | | |
|---|---|---|
| JP | SHOU 62-10803 | 1/1987 |
| JP | SHOU 63-111703 | 1/1987 |
| JP | 10-199306 | 7/1998 |
| JP | 10-261302 | 9/1998 |
| JP | SHOU 63-30451 | 12/1998 |

*Primary Examiner*—Stephen Husar
(74) *Attorney, Agent, or Firm*—Morgan, Lewis & Bockius LLP

(57) ABSTRACT

A projection type lamp is disclosed that includes a semi cylindrical lens portion having a focus line oriented in a horizontal direction. Similar to spherical lens portions can be formed at the right and left side of the semi cylindrical lens portion to produce a projection lens having a relatively long horizontal diameter. The lamp includes a reflector that has a first focus point in the vicinity of the light source of the projection type lamp and a second focus point in the vicinity of the focus line in the vertical cross-sectional view. The reflector can include a free curved surface for adjusting light rays emitted from the light source to a predetermined illuminating angle. The semi cylindrical portion of the lens does not function optically in the horizontal direction such that light distribution patterns can be easily determined and manipulated by the reflector.

19 Claims, 4 Drawing Sheets

PROJECTION LAMP

This invention claims the benefit of Japanese patent Application No. HEI 10-305781, filed on Oct. 27, 1998, which is hereby incorporated by reference.

BACKGROUND OF THE INVENTION

1. Field of the Invention

This invention relates to a lamp and, more particularly, to a projection type headlamp for a vehicle in which a projection lens is disposed such that a focus point of the projection lens corresponds to a second focus point f2 of an elliptic reflection surface. A light distribution pattern of the headlamp is defined by projecting a cross-sectional luminous flux and converging it into the second focus point f2.

2. Discussion of the Related art

FIG. 8 illustrates a conventional projection type headlamp in which a light source 92 is located close to a first focus point f1 of a reflector 91. The reflector 91 is circular as viewed from the front with an elliptically shaped surface as viewed from the side forming an opening. A projection lens 93 is disposed adjacent the opening in the reflector 91. The lens 93 has a focus point f3 located close to a second focus point f2 of the reflector and into which light emitted from light source 92 converges.

Of the many light rays that converge into the second focus point f2, only light rays having an appropriate cross-sectional orientation for forming the specific light distribution pattern for the head lamp 90 can pass through the projection lens 93. Other light rays are prohibited from passing through the projection lens 93 by a shade 94.

However, the light from the light source 92 converges into the second focus f2 and diffuses and radiates through the projection lens 93 toward the direction of irradiation for the headlamp 90. Accordingly, the light will diffuse in a radiating direction after the light passes through the projection lens 93.

Therefore, the conventional projection type lamp 90 has a light distribution pattern whose shape is easily determined, but whose luminous intensity distribution can not be freely determined because it is substantially impossible to concentrate or distribute light rays at predetermined positions due to the diffusing characteristic which are maintained even after the light rays pass through the projection lens 93. Specifically, it is difficult to form a light distribution pattern for high beam mode because it requires a large amount of light directed outwardly from the front of the vehicle to provide long distance visibility in the high beam mode.

The conventional projection type headlamp 90 and the projection lens 93 are formed in a circular shape as seen from the front of a vehicle. This type of circular projection lens 93 is unsuitable for current design trends in automobile body design. To meet current design requirements, it is sometimes preferred to cut of the upper and lower portions of the projection lens 93. In this case, the amount of light passing through the lens decreases and lowers a driver's ability to see when using the headlamp.

SUMMARY OF THE INVENTION

The invention is directed to a projection type lamp that substantially obviates one or more of the above problems due to the limitations and disadvantages of the conventional projection type lamps.

According to the invention, the above objects are achieved by providing a projection type headlamp including an oval projection lens with a long horizontal diameter, a light source, and a reflector. The oval projection lens can be shaped such that the lens includes two substantially similar to sphericallens portions formed by dividing a substantially hemispherical lens into two parts at its diameter and attaching the similar to sphericallens portions to opposite ends of a semi cylindrical lens portion. The longest width of the oval projection lens is called a horizontal diameter in this specification since the lens is intended to be mounted on a vehicle with the horizontal width substantially parallel to the travel surface for the vehicle. The semi cylindrical lens portion has a focus line extending in the horizontal direction.

The reflector can be elliptically shaped and include a first focus point located close to the light source in a vertical cross-sectional view, and a second focus point located close to the focus line in a horizontal cross-sectional view. In addition, a free curved surface on the reflector can provide a predetermined horizontal irradiation angle to the light emitted from the light source. The width of the free curved surface can be the same as that of the semi cylindrical lens portion in the horizontal direction.

BRIEF DESCRIPTION OF THE DRAWINGS

The accompanying drawings, which are included to provide a further understanding of the invention and are incorporated in and constitute a part of this specification, illustrate embodiments of the invention and together with the description serve to describe the principles of the invention.

DETAILED DESCRIPTION OF THE PREFERRED EMBODIMENTS

The preferred embodiments of the invention will be described with reference to the drawings.

Figure 1:
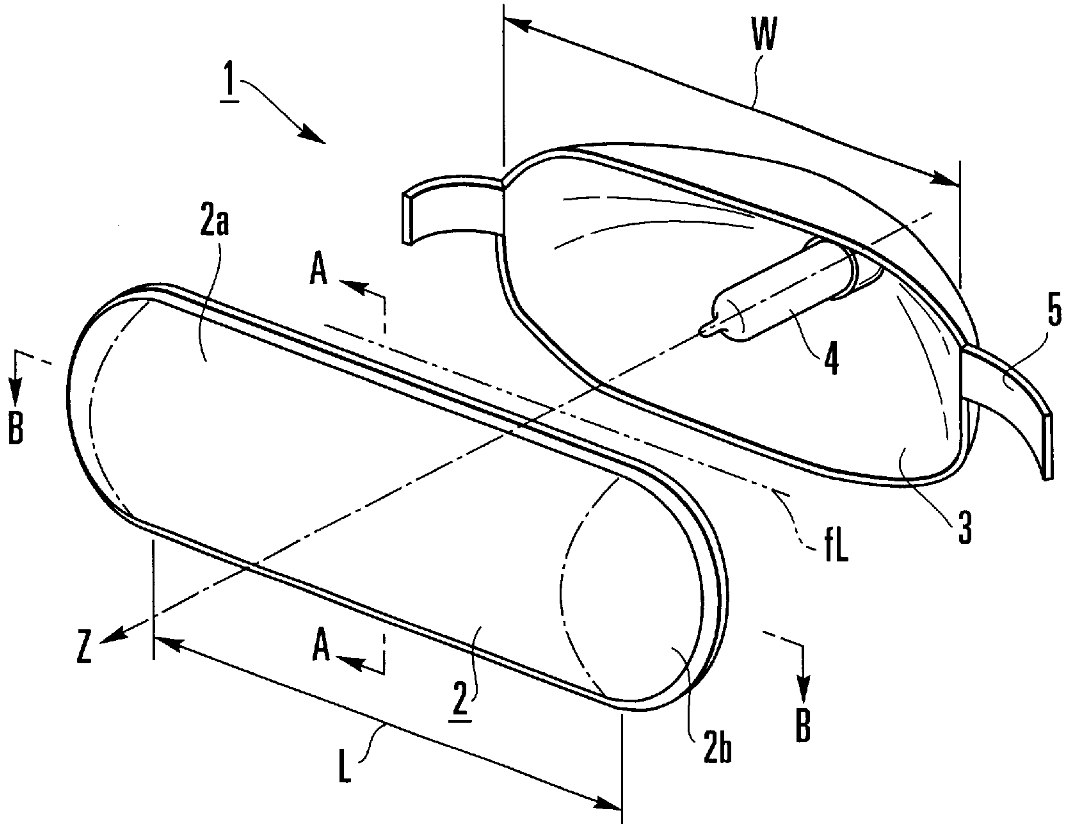
FIG. 1 is a partial perspective exploded view of a preferred embodiment of a projection type headlamp made in accordance with the principles of the invention.
Figure 2:
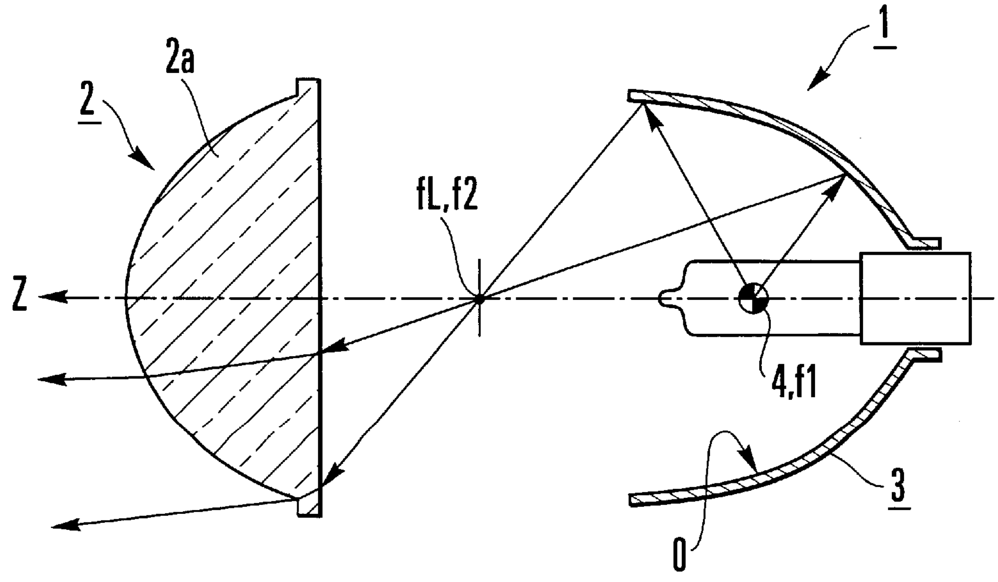
FIG. 2 is a cross-sectional view taken along line A—A of FIG. 1.
Figure 3:
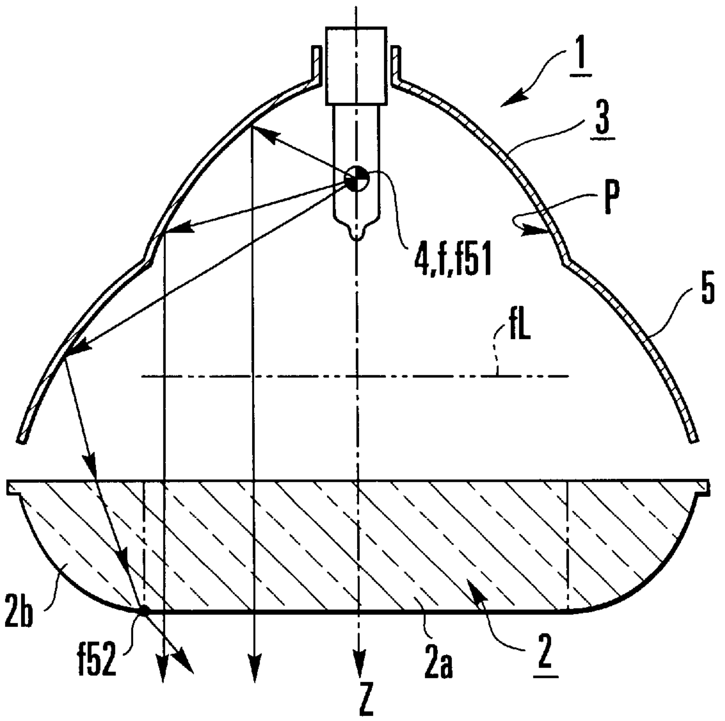
FIG. 3 is a cross-sectional view taken along line B—B of FIG. 1.

A preferred embodiment of the invention is shown in FIGS. 1, 2 and 3. The projection type lamp 1 of FIGS. 1, 2 and 3 includes a light source 4, a reflector 3 and a projection lens 2. Projection lens 2 can be formed as an oval projection lens 2 that has a long horizontal diameter. The projection lens 2 includes a semi cylindrical lens portion 2*a* whose width is L, and two approximately similar to sphericallens portions 2*b* which are attached at opposite ends of the semi cylindrical lens portion 2*a,* respectively. When the lens 2 is attached to a vehicle, the width L of the semi cylindrical lens portion 2*a* is attached to the vehicle horizontally, i.e. - attached such that the width L is substantially parallel to the travelling surface. The similar to sphericallens portions 2*b* can be formed by dividing an approximately hemi-spherical lens into two parts at its diameter. The lens 2 is formed with each of the two parts at opposite ends of the semi cylindrical lens portion 2*a* such that the divided surfaces face each other and are intervened by the width L of the semi cylindrical lens portion 2*a*. Accordingly, projection lens 2 can have a focus line fL having the same length as the width L of the semi cylindrical lens portion 2*a*.

The reflector 3 has a vertical cross-sectional view that is different from its horizontal cross-sectional view. In the vertical cross-sectional view of the embodiment of FIGS. 1, 2 and 3, the first focus point f1 of the ellipse O is formed close to the light source 4, and the second focus point f2 of the ellipse O is located close to the focus line fL of the projection lens 2. In the horizontal cross-sectional view, a parabola P has a focus point f located close to the light source 4. A width W of the reflector 3 corresponds to the width L of the semi cylindrical lens portion 2*a*.

The light from the light source 4 converges close to the focus line fL as viewed from a vertical cross-section and shown in FIG. 2. The light from the light source 4 is parallel to an optical axis Z in the horizontal direction as indicated in the FIG. 3.

The semi cylindrical lens portion 2*a* of the projection lens 2 has a convex or projected curved surface in the vertical cross-sectional view as shown in FIG. 2. The light from the light source 4 is adjusted to the appropriate irradiation angle by the convex or projected curved surface. In the horizontal cross-sectional view, the semi cylindrical lens portion 2*a* has little or no curvature and the light that is radiated from the lens is therefore parallel.

In the vertical direction, the reflector 3 and the semi cylindrical lens portion 2*a* combine to affect the formation of light distribution characteristics. In the horizontal direction, only the reflector 3 affects the light distribution characteristics of the lamp. Therefore, in order to use the projection lamp 1 in vehicles, the focus of the parabola P in the horizontal cross-sectional direction must be located in front of the light source 4 (in the direction of the light radiation) such that light reflected by the reflector P diffuses horizontally.

Figure 4:
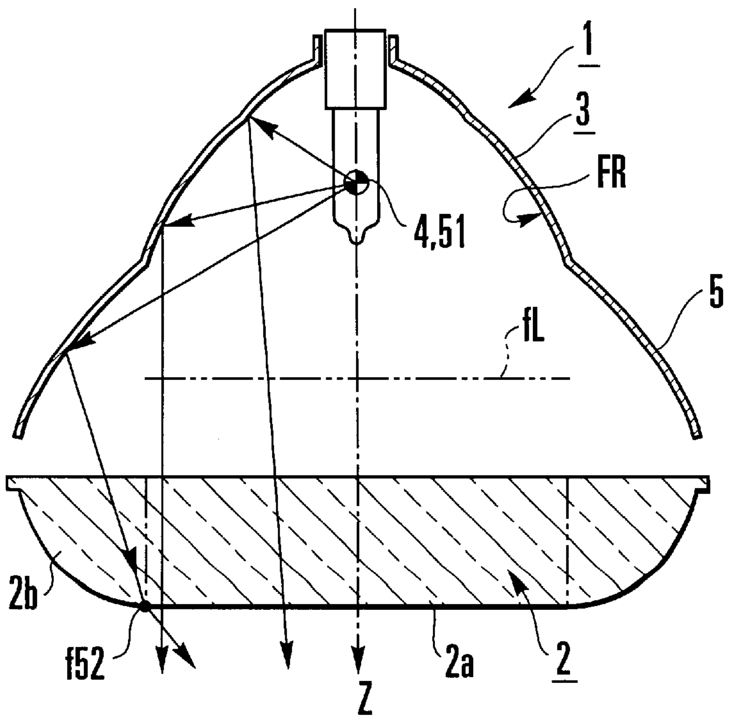
FIG. 4 is a cross-sectional view of another preferred embodiment of the invention.
Figure 5:
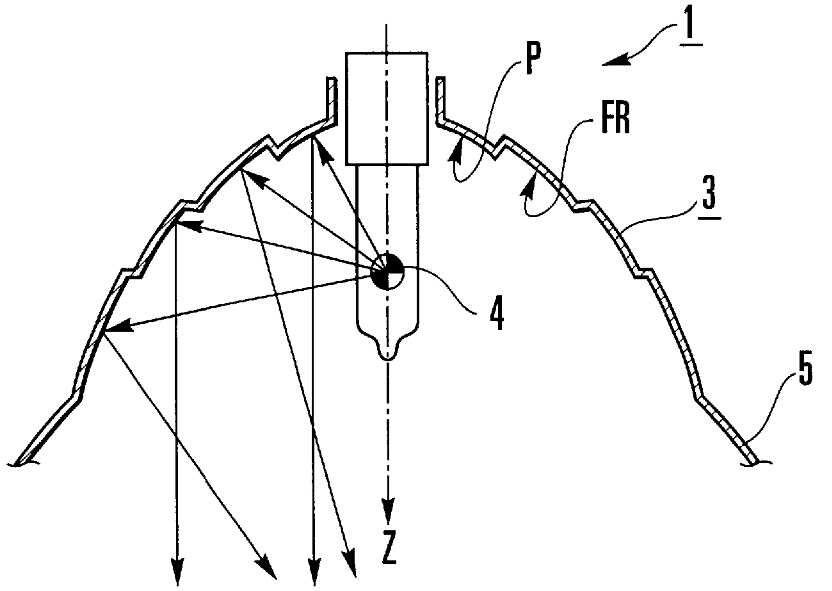
FIG. 5 is a cross-sectional view of yet another preferred embodiment of the invention.

As shown in FIGS. 4 and 5, a side reflector 5 can be attached to the reflector 3. The side reflector 5 has a first focus point f51 which is close to the light source 4 and a second focus point f52 which is close to the top portion of a similar to sphericallens portion 2*b*.

The light from the light source 4 that is reflected by the side reflector 5 converges close to the similar to spherical-lens portions 2*b*, causing light rays to radiate towards an optical axis Z of the projection type headlamp 1. Accordingly, light rays cross the optical axis Z of the projection type headlamp 1, and then spread in the horizontal direction. The light distribution characteristics of the projection type headlamp 1 are determined by a combination of light reflected by both the side reflector 5 and reflector 3.

Irradiation angle and direction can be changed by adjusting the vertical position or the vertical width of the side reflector 5. For example, if the side reflector 5 is mounted on an upper side of the horizontal line passing through the light source 4, the light reflected from the side reflector 5 passes through only the lower side of the horizontal line.

FIG. 4 illustrates another preferred embodiment of the invention. Since horizontal light distribution characteristics are determined by reflector 3, the light distribution characteristics and amount of light can be easily adjusted by changing the curvature of the horizontal cross-sectional surface of reflector 3. Accordingly, in order to provide a projection type headlamp which can illuminate objects at a great distance, a free curved surface FR can be incorporated into reflector 3. The center portion of the reflector 3 can spread the light from the light source 4 in the horizontal direction, and both right and left ends of the reflector 3 can reflect the light from the light source 4 in a direction parallel to the optical axis Z.

The curvature of the reflector as shown in the horizontal cross-sectional view is not limited to a parabola P or a free curved surface FR. As shown in FIG. 5, a multi-shaped reflector 3 can be used in the projection type headlamp 1. The multi-shaped reflector is formed by dividing the internal surface of the reflector 3 into plural sections which respectively have flexibly defined areas and positions. A parabola P, free curved surface FR, parabolic semi cylindrical surface, or the like, can be combined to form the multi-reflector surface 3.

Figure 6:
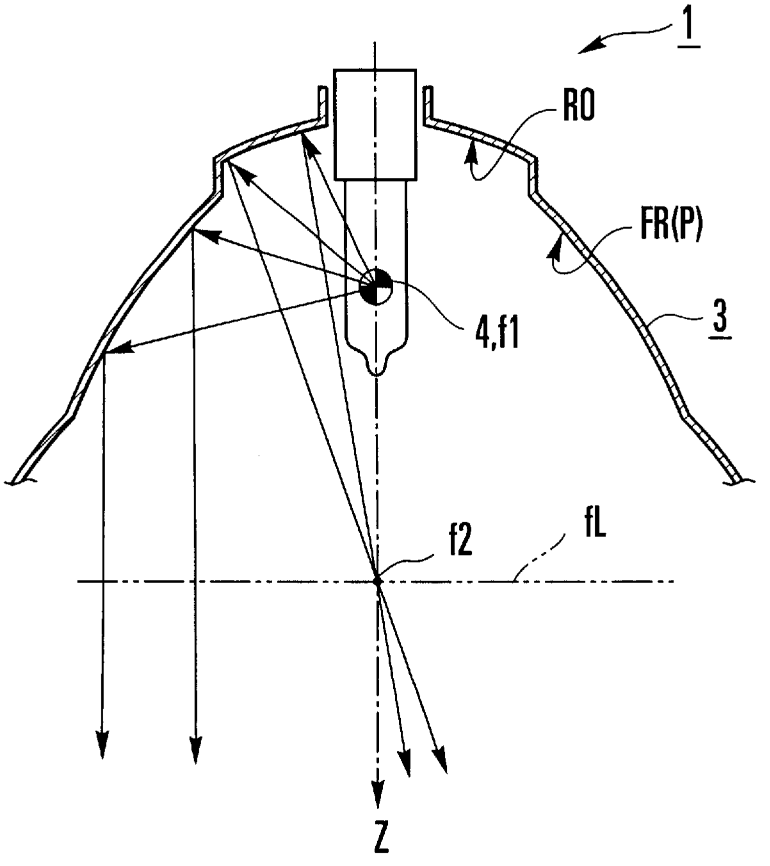
FIG. 6 is a cross-sectional view of a further preferred embodiment of the invention.

FIG. 6 illustrates another embodiment of the invention in which a rotated elliptic surface RO has a first focus point f1 located close to the light source 4 and a second focus point f2 located close to the focus line fL and disposed in the center of the reflector 3. A free curved surface FR and/or a parabola surface P can be disposed at both the right and left sides of the reflector 3 to reflect light from the light source 4 in a direction parallel to the optical axis Z. The irradiation angle of the light reflected from the rotated elliptic surface RO is narrowed as viewed in the vertical cross-section by the semi cylindrical lens 2*a* only. The irradiation angle of the light from light source 4 is maintained in a horizontal direction. However, the light reflected from the free curved surface FR and/or the parabola P can be radiated away from the light source 4 to illuminate objects at a great distance.

The configuration of the projection lens 2 directs light in a horizontal direction by one or more reflecting surfaces located in the back side of the projection lens 2. The semi cylindrical lens portion 2*a* does not direct light distribution patterns in a horizontal direction and only directs light in a vertical direction. Therefore, the form or distribution of light projected by lamp 1 can be easily manipulated by combining reflecting surfaces with various irradiation angles, either horizontally wide angles or angles converging to a point in a horizontal direction.

The semi cylindrical lens portion 2*a* of the oval projection lens 2 can have a horizontal width of over 30 millimeters. Preferably, the horizontal width of the projection type lamp 1 is 2–6 times longer than the vertical height of the projection type lamp 1.

Figure 7:
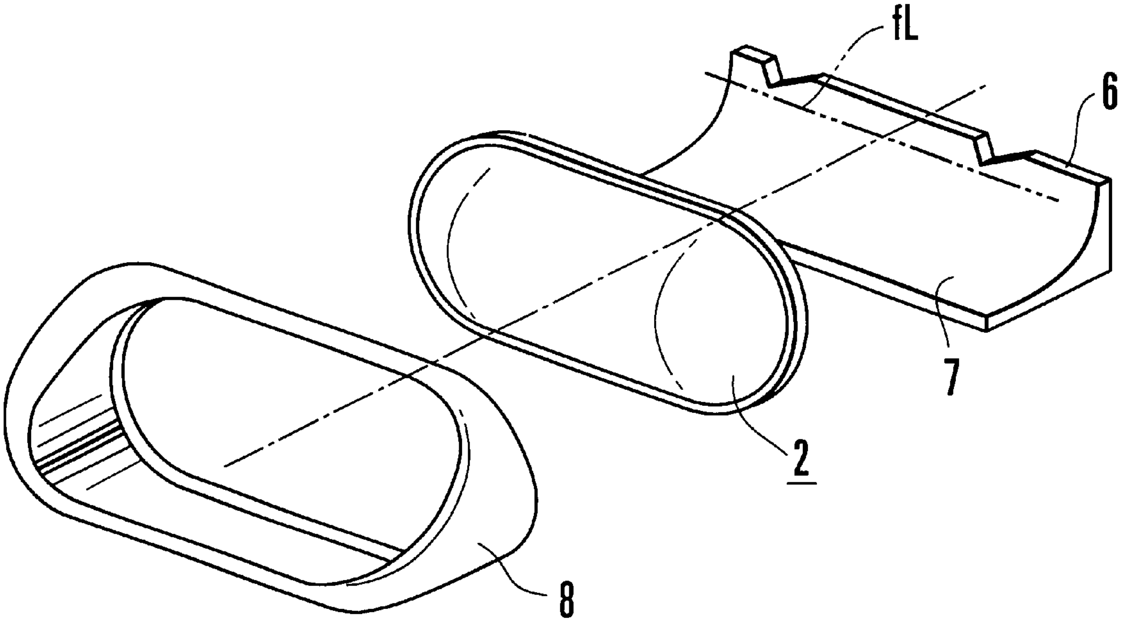
FIG. 7 is a cross-sectional view of still another preferred embodiment of the invention.
Figure 8:
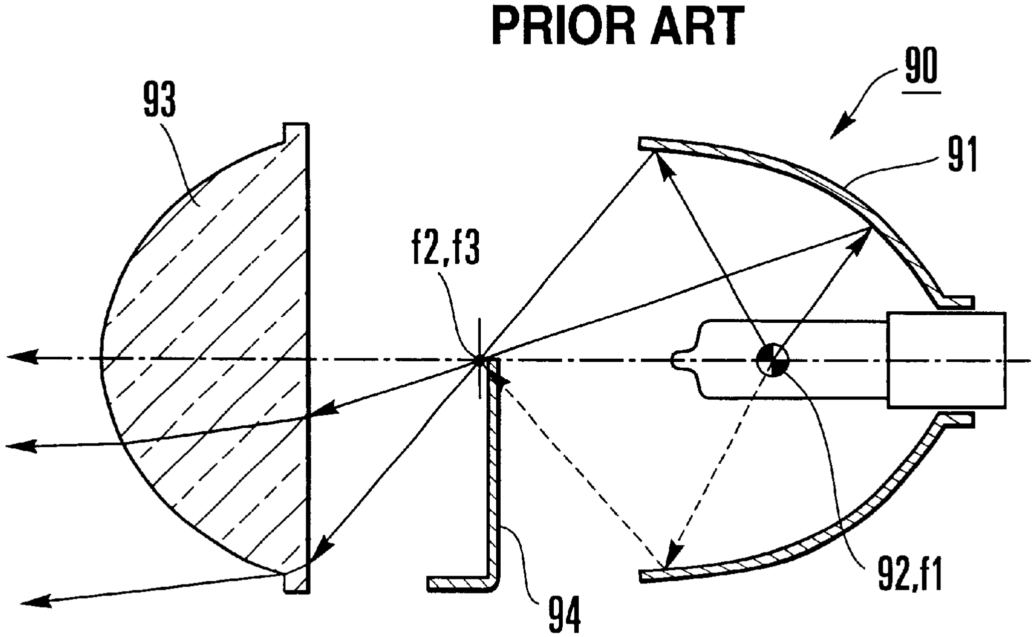
FIG. 8 PRIOR ART
FIG. 8 is a cross-sectional view of a conventional projection type headlamp.

The light distribution pattern of the projection type lamp 1 can be switched from a highbeam/travelling mode to low-beam/passing mode. When low beam light distribution is required, as shown in FIG. 7, the shade 6 mounted close to the focus line fL is moved to its low-beam position.

The shade 6 can include an inner extension 7. Since the semi cylindrical lens portion 2*a* mounted to the projection type headlamp 1 does not direct or control light in the horizontal cross-sectional view, the lens appears to be transparent from a horizontal direction and the inner construction of the lamp 1 can be seen through the surface of the projection lens 2. The view of the inner construction of the lamp 1 may cause a bad appearance problem for the projection type lamp 1.

In order to prevent this bad appearance problem, inner extension 7 is designed to cover the inner construction of the lamp. An aesthetic appearance can be achieved by making the inner extension 7 from colored materials corresponding to the automobile body color. The inner extension 7 can also be made from black color materials, or materials shined by chromium coating or aluminum evaporation and can be shaped in various manners to be more aesthetically pleasing.

When the shade 6 is mounted to the projection type lamp 1, the inner extension 7 lies between the projection lens 2*a* and the shade 6. The inner extension 7 and the shade 6 may be formed as one unit. In addition, as shown in FIG. 7, an outer extension 8 can be formed along a perimeter of the projection lens 2 on the side at which light radiates. The material of the outer extension 8 can be the same as that of the inner extension 7. By attaching the outer extension 8 to the projection lens 2 the inner construction of the projection type lamp 1 is further prevented from being seen from outside of the projection type lamp 1.

The operational advantages of the invention will now be described. The projection type headlamp 1 includes a projection lens 2 that has a relatively large horizontal length, a light source 4 and a reflector 3. The projection lens 2 is a combination of the semi cylindrical lens 2*a* whose center portion is horizontally parallel to the focus line fL, and includes similar to sphericallens portions 2*b*. The semi cylindrical lens portion 2*a* can be located between the similar to sphericallens portions 2*b*. The reflector 3 can be shaped as an ellipse in the vertical cross-sectional view and have a first focus point f1 close to the light source 4 and a second focus point close to the focus line fL. In the horizontal cross-sectional view, the reflector 3 can have a free curved line which adjusts the light from the light source 4 to predetermined horizontal radiation angles. The width of the reflector 3 can be the same as that of the semi cylindrical lens portion 2*a*. Since the semi cylindrical lens portion 2*a* does not direct or focus light as viewed in a horizontal cross-section, the reflector 3 positioned on the back side of the projection type headlamp 1 contributes significantly to the formation of light distribution characteristics. For example, the amount of light irradiated to a distant place is determined primarily by the shape of reflector 3. In addition, since the projection type headlamp 1 includes a projection lens 2 that has a large horizontal length or diameter, the projection type headlamp 1 is vertically compact and can be incorporated into automobile designs that have a long horizontal body. Furthermore, the projection type headlamp 1 contributes to the aesthetic appeal of vehicles because the inner extension 7 and outer extension 8 prevent the inner construction of the lamp 1 from being seen from outside of the headlamp 1.

It will be apparent to those skilled in the art that various modifications and variations can be made in the method for fabricating a lamp and lens constructions of the invention without departing from the spirit or scope of the invention. Thus, it is intended that the invention cover the modifications and variations of this invention provided they come within the scope of the appended claims and their equivalents.

What is claimed is:

1. A projection type lamp, comprising:

a projection lens having a horizontal diameter and a vertical diameter that is less than said horizontal diameter, said projection lens including a semi-cylindrical portion with a focus line;

a reflector;

a light source located between said projection lens and said reflector, wherein said reflector is located at said back side of said light source and includes a first surface with a first focus point located adjacent said light source and a second focus point located approximately coincident with a portion of said focus line as viewed from a vertical cross-section, said reflector including a second surface capable of directing light emitted from said light source at a predetermined illumination angle as viewed from a horizontal cross-section.

2. The projection type lamp of claim 1, wherein said reflector has a parabolic shape in a horizontal cross-sectional view.

3. The projection type lamp of claim 1, wherein said reflector and projection lens in combination determine light distribution patterns as viewed in a vertical cross section, and said reflector solely determines the light distribution patterns as viewed in a horizontal cross-section.

4. The projection type lamp of claim 1, wherein said semi-cylindrical portion has a first and second end with a similar to spherical portion being located at either end of said semi-cylindrical portion.

5. The projection type lamp of claim 4, wherein said similar to spherical portion has a top surface and a bottom surface, said bottom surface being located between said light source and said top surface.

6. The projection type lamp of claim 5, wherein said reflector includes a side reflector having a first side focus point located adjacent said light source and a second side focus point located adjacent said top surface of said similar to spherical lens portion.

7. The projection type lamp of claim 1, wherein said reflector includes a plurality of differently shaped and positioned sections, and the horizontal width of said reflector is substantially equal to said horizontal diameter of said projection lens.

8. The projection type lamp of the claim 1, wherein said reflector includes a rotated elliptic surface and a free curved surface, said rotated-elliptic surface having a first elliptic focus point adjacent said light source and a second elliptic focus point approximately coincident with said focus line.

9. The projection type lamp of claim 8, wherein said free curved surface is a parabolic surface.

10. The projection type lamp of claim 1, further comprising:

a shade located adjacent said focus line of said semi cylindrical portion.

11. The projection type lamp of claim 10, further comprising an inner extension located between said projection lens and said shade.

12. The projection type lamp of claim 11, wherein said inner extension and said shade are formed as one unit.

13. The projection type lamp of claim 1, further comprising:

an inner extension made from one of a colored and a shiny material, said inner extension located between said projection lens and said reflector.

14. The projection type lamp of claim 1, further comprising:

an outer extension made from one of a colored and a shiny material, said outer extension located adjacent a perimeter of said projection lens.

15. The projection type lamp of claim 1, wherein the width of said semi cylindrical portion of said projection lens is greater than 30 millimeter, and said horizontal diameter of the projection lens is approximately 2 to 6 times longer than said vertical diameter.

16. The projection lamp of claim 1, wherein said projection lens is shaped as an oval.

17. The projection lamp of claim 1, wherein said first surface is elliptical in shape as viewed in a horizontal cross-section.

18. The projection lamp of claim 1, wherein said second surface includes a free curved shape.

19. The projection lamp of claim 1 wherein said reflector has a horizontal width that is substantially equal to a horizontal width of said semi-cylindrical portion.

* * * * *